United States Patent
Grimm et al.

(10) Patent No.: US 6,966,603 B2
(45) Date of Patent: Nov. 22, 2005

(54) AIR DEFLECTOR FOR A VEHICLE ROOF

(75) Inventors: Rainer Grimm, Frankfurt am Main (DE); Thomas Becher, Rodgau (DE); Horst Böhm, Frankfurt am Main (DE)

(73) Assignee: ArvinMeritor GmbH, Dietzenbach (DE)

( * ) Notice: Subject to any disclaimer, the term of this patent is extended or adjusted under 35 U.S.C. 154(b) by 60 days.

(21) Appl. No.: 10/787,531

(22) Filed: Feb. 26, 2004

(65) Prior Publication Data
US 2004/0189057 A1 Sep. 30, 2004

(30) Foreign Application Priority Data
Feb. 27, 2003 (DE) .................. 103 08 583

(51) Int. Cl.[7] ................................. B60J 7/22
(52) U.S. Cl. ....................................... 296/217
(58) Field of Search ........................ 296/217

(56) References Cited
FOREIGN PATENT DOCUMENTS

| DE | 295 15 190 U1 | 11/1995 |
|---|---|---|
| DE | 101 30 405 A1 | 1/2003 |
| EP | 0 744 311 A1 | 11/1996 |
| EP | 1 342 600 A2 | 9/2003 |
| JP | 2002-127752 | * 5/2002 |

OTHER PUBLICATIONS

European Search Report, Jun. 11, 2004.

* cited by examiner

Primary Examiner—Dennis H. Pedder
(74) Attorney, Agent, or Firm—Carlson, Gaskey & Olds

(57) ABSTRACT

An air deflector for a vehicle roof has a first holding element attached to the vehicle roof, a second holding element that is movable between a lowered position and a raised position, a flexible deflector element secured to the two holding elements, and at least one flexible positioning element that pushes the deflector element in a predetermined direction when the first holding element is moved from the raised to the lowered position. The positioning element urges the deflector element into the predetermined direction to prevent the deflector element from interfering with other vehicle components.

8 Claims, 4 Drawing Sheets

US 6,966,603 B2

AIR DEFLECTOR FOR A VEHICLE ROOF

REFERENCE TO RELATED APPLICATIONS

The present invention claims the benefit of German Patent Application No. 103 08 583.1, filed Feb. 27, 2003.

TECHNICAL FIELD

The present invention relates to an air deflector for a vehicle roof, such as air deflectors used in connection with a sliding sunroof or a folding roof system.

BACKGROUND OF THE INVENTION

Vehicle roofs, and specifically sliding sunroofs or folding roof systems, may employ air deflectors to improve air flow conditions over the vehicle when the cover of the roof system is in an open position. The air deflector is usually arranged on a front edge, with respect to the travel direction of the vehicle, of the roof opening that is closed by the cover. The air deflector can also be conveyed from a lowered position, in which it is located beneath the outer surface of the vehicle roof, to a raised position when the cover is opened.

The air deflector can employ a flexible web or fabric as a deflector element and arrange the deflector element between two holding elements. A first holding element is fixedly attached to the vehicle roof and the second holding element can move between a lowered and a raised position. If the second holding element is in its lowered position, then the deflector element can be folded to save space due to its flexibility. The result is a compact assembly, especially with respect to the overall height of the deflector element.

The flexible deflector element has one disadvantage, however, it does not fold up in a self-controlling fashion. Thus, a comparatively large amount of space must be made available to allow the deflector element to move freely within its range when the second holding element is conveyed to the lowered position without the deflector element coming into conflict with other components of the sliding sunroof system. Alternatively, if such a large amount of space is not available, the deflector element must be secured in another way so that the deflector element does not collide with other components when the second holding element is placed in the lowered position.

There is a desire for an air deflector structure that can control movement of the deflector element without experiencing the disadvantages encountered in currently-known structures.

SUMMARY OF THE INVENTION

The present invention is directed to an air deflector for a vehicle roof comprising a first holding element, which is designed to be attached to the vehicle roof; a second holding element, which can be moved between a lowered and a raised position; a flexible deflector element, which is secured to both holding elements; and at least one flexible positioning element, which pushes the deflector element in a pre-established direction when the second holding element is moved from the raised to the lowered position. The positioning element is advantageously an elastically deformable lip that is configured as an integral component of a piping or weather strip provided on the deflector element. Due to the inherent elasticity of the positioning element, it pushes the deflector element in a predetermined direction when the deflector element begins to relax, allowing the deflector element to be freely folded up without interfering with other vehicle components.

BRIEF DESCRIPTION OF THE DRAWINGS

The present invention is described below on the basis of an example embodiment, which is depicted in the attached drawings.

DETAILED DESCRIPTION OF THE EMBODIMENTS

Figure 1:
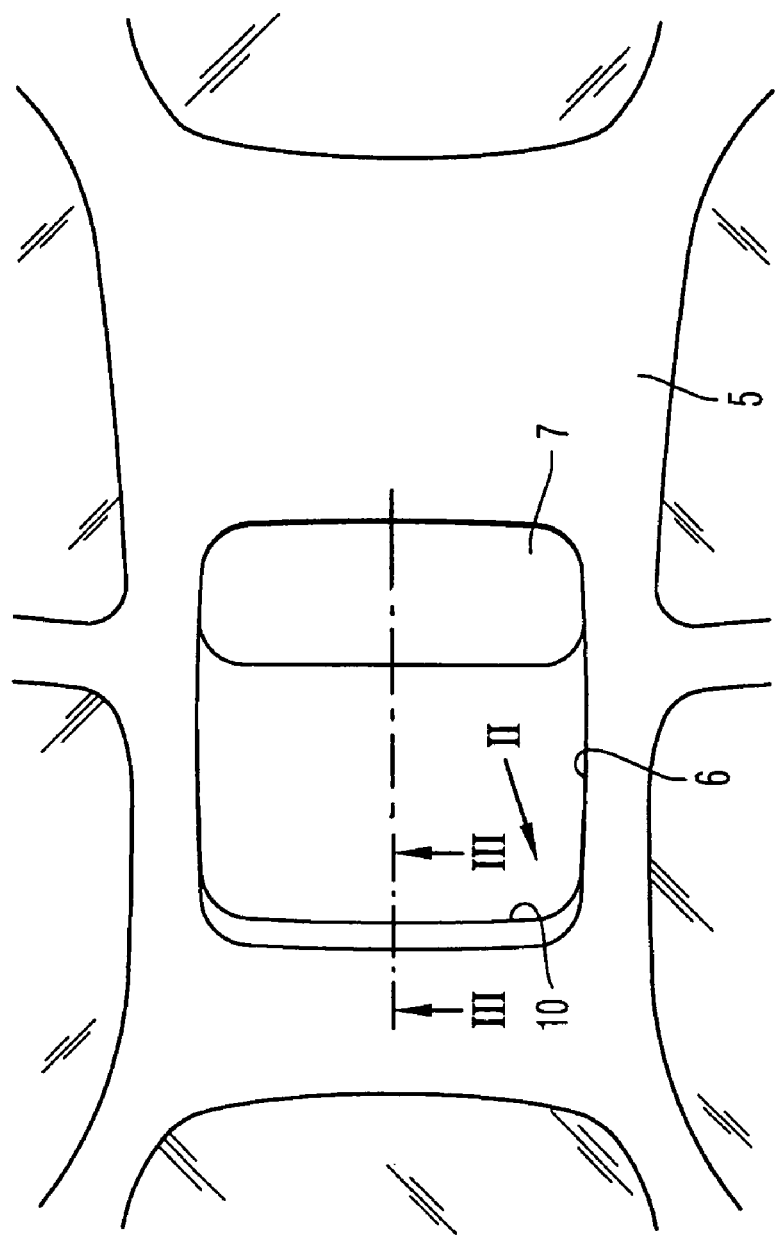
FIG. 1 is a top view depicting a vehicle roof having a sliding sunroof system, the cover of the sliding sunroof system being shown in the opened position.

FIG. 1 shows a vehicle roof 5 having a sliding sunroof system with a roof opening 6 and a cover 7. The cover 7 can be moved from a closed position, in which it closes roof opening 6, to an opened position. FIG. 1 shows the cover 7 in an opened position in which most of the roof opening 6 is exposed.

An air deflector 10 is attached on the front edge of roof opening 6 with respect to the vehicle. The air deflector 10 can be raised toward the outside of the vehicle when the cover 7 is in its opened position.

Figure 2:
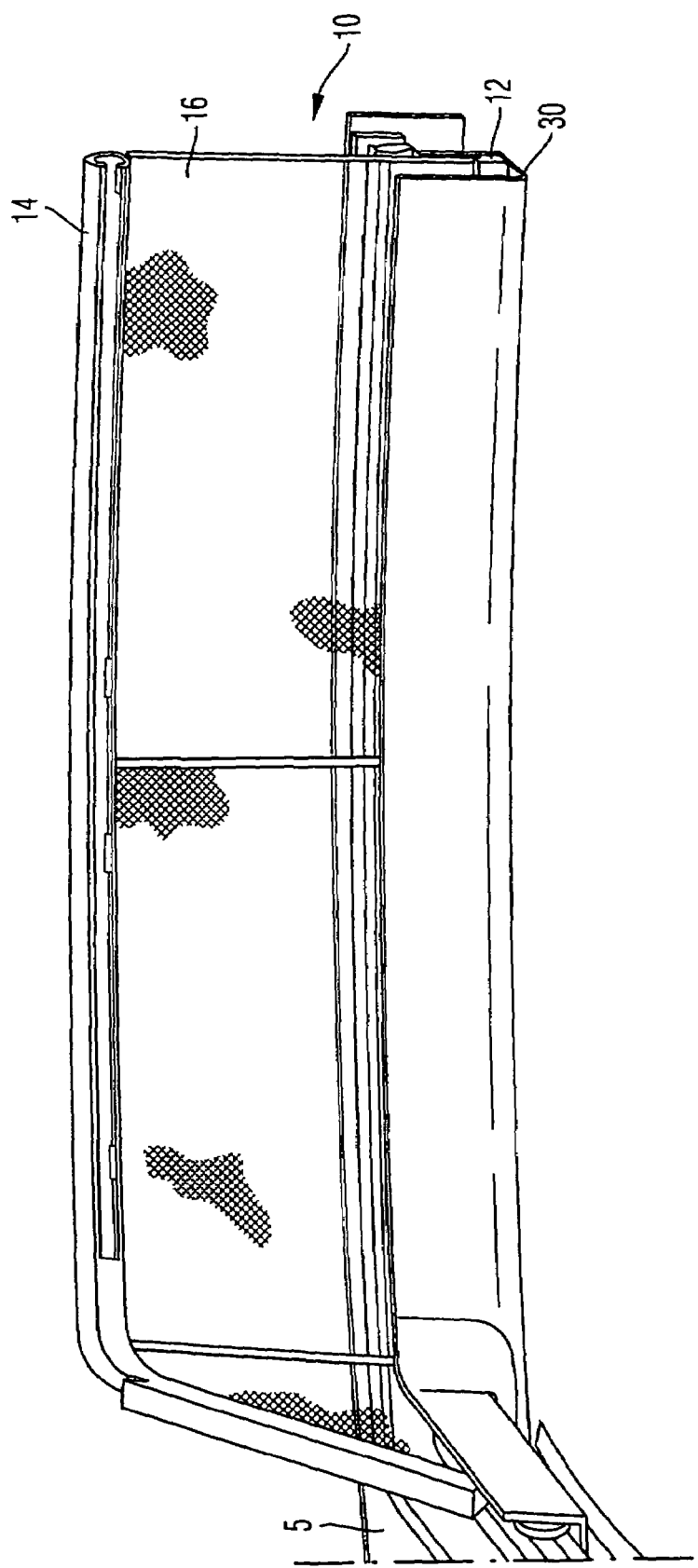
FIG. 2 is a perspective view taken in the direction of Arrow II from FIG. 1 and showing an air deflector that is used in the sliding sunroof system according to one embodiment of the invention.

As shown in FIG. 2, the air deflector 10 comprises a first holding element 12 that is fixedly attached to the vehicle or to a sliding sunroof frame 30 and a second holding element 14 that is movable relative to the first holding element. More particularly, the second holding element 14 is movable between a first, lowered position, in which it is located beneath the outer skin of the vehicle roof 5 so that the cover 7 can be closed, and a second, raised position, as shown in FIG. 2, in which the second holding element 14 extends toward the outside of the vehicle beyond the outer skin of the vehicle roof 5.

The precise manner in which the second holding element articulates on the vehicle roof as well as the mechanism for moving the second holding element between the raised and lowered positions is not relevant for understanding the present invention, so no further discussion thereof will be entered into here. The only relevant feature is that the air deflector 10 includes a mechanism that conveys the second holding element 14 from the raised to the lowered position when the roof 7 is closed.

Figure 3:
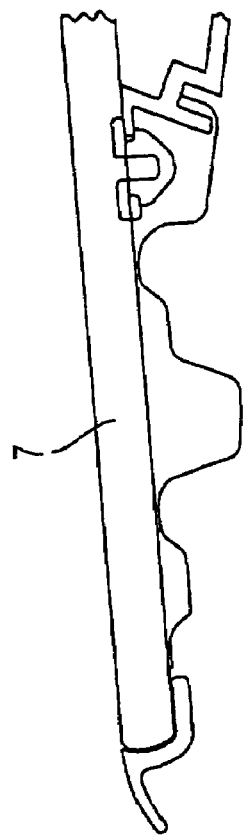
FIG. 3 is a schematic view taken along plane III—III from FIG. 1.
Figure 3:
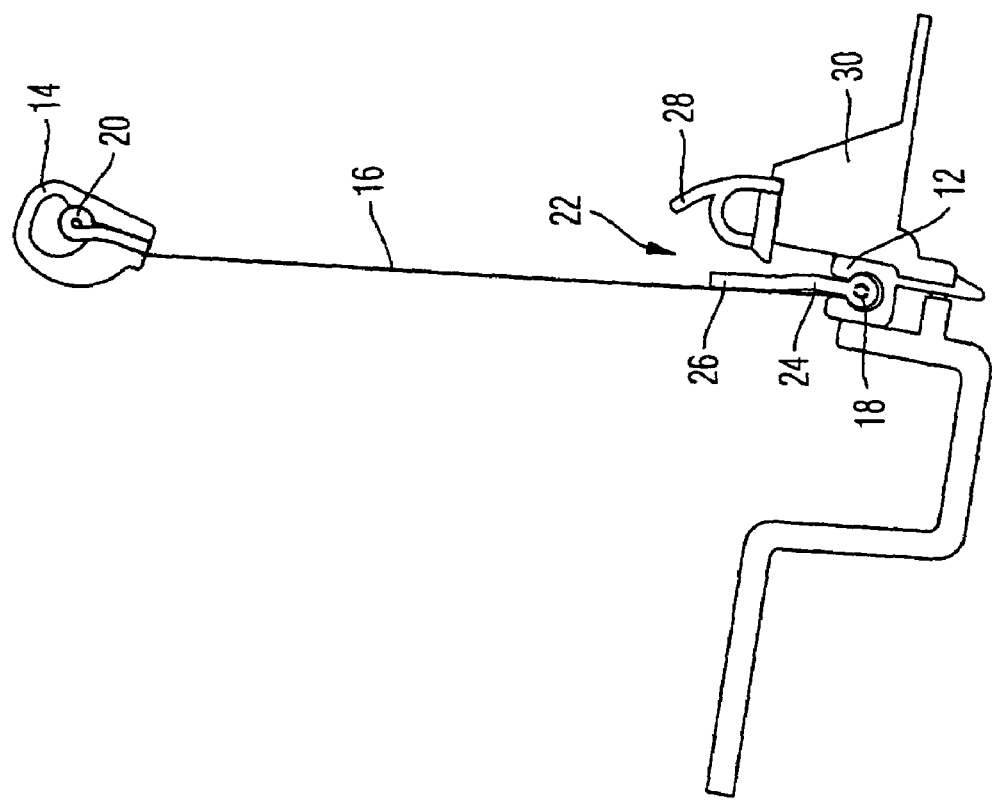

A flexible deflector element 16 is arranged between the first holding element 12 and the second holding element 14. The flexible deflector element 16 can be made of any flexible sheet-like material, such as a web or fabric part. A first edge of the deflector element 16 has a first piping or weather strip 18 and is assigned to the first holding element 12 and a second edge of the deflector element 16 has a second piping or weather strip 20 and is assigned to the second holding element (FIG. 3). In one embodiment, both pipings 18, 20 are made of plastic and are secured to the deflector element 16. The first piping 18 is received in the first holding element 12 and the second piping 20 is received in the second holding element 14. If the second holding element 14 is in its raised position, the deflector element 16 is stretched taut between the two holding elements 12, 14 as shown in FIG. 3.

Figure 4:
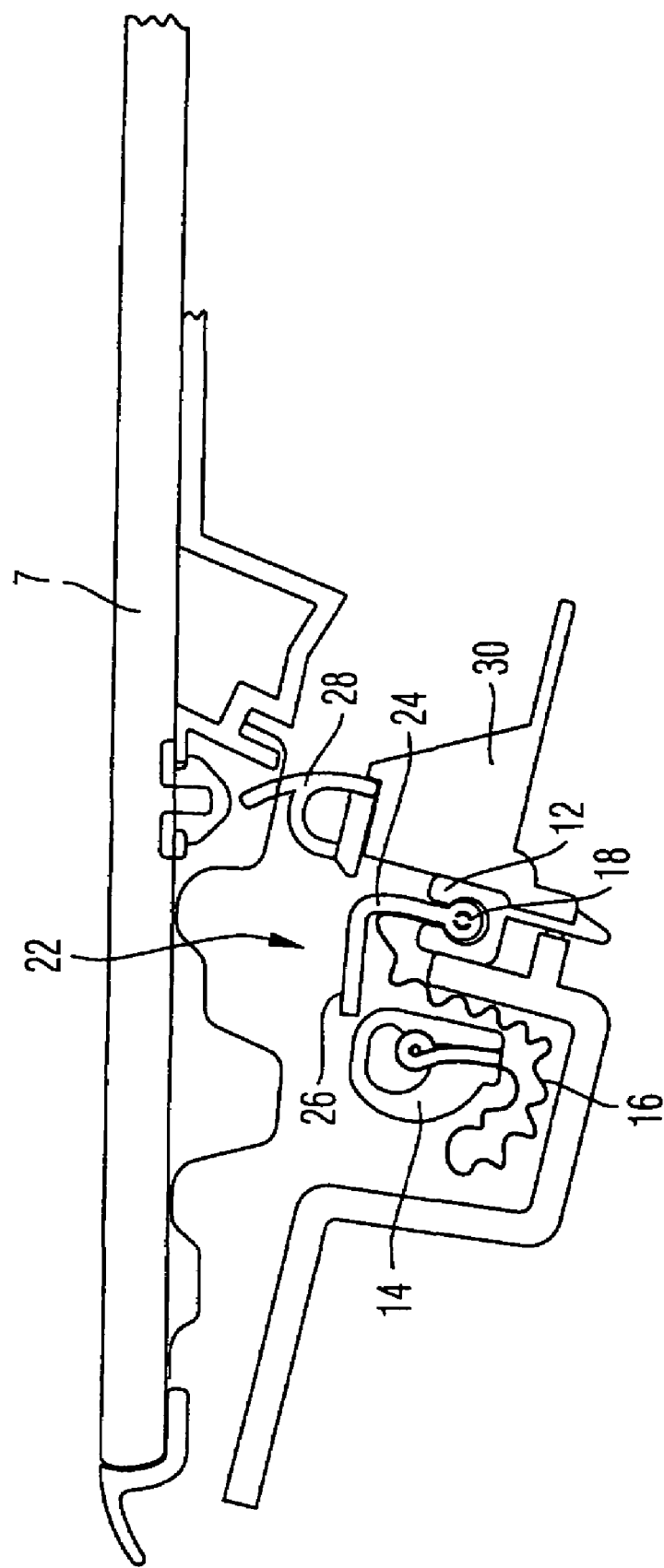
FIG. 4 is a view corresponding to the view in FIG. 3 showing the cover in the closed position.

A positioning element 22 is integrally formed with the first piping 18. In the illustrated embodiment, the positioning element 22 is configured as a flexible, elastically deformable and resilient lip. The positioning element 22 has two shanks 24, 26 that are arranged roughly at a right angle to each other when the air deflector 10 is in an initial state, i.e., when no external forces are acting on the air deflector 10 (FIG. 4). The first shank 24 extends in an upward direction, in the direction that the deflector element 16 would extend if it were stretched tight, and the second shank 26 extends roughly horizontally towards the front of the vehicle.

When the deflector element 16 is stretched tight when the air deflector 10 is in the opened position, the second shank 26 of the positioning element 22 is elastically bent upward by roughly 90° so that it extends in the same direction as the first shank 24 and the stretched deflector element 16 (FIG. 3).

As soon as second holding element 14 is moved in a downward direction to its lowered position, the tension in the deflector element 16 relaxes. As a result, the second shank 26 of the positioning element 22 can elastically return to its initial position (i.e., moving 90° in a counterclockwise motion in the orientation shown in FIGS. 3 and 4). When the positioning element 22 relaxes, it pulls the deflector element 16 and guides the deflector element 16 as it folds. In the orientation in FIGS. 3 and 4, the lower portion of the deflector element 16 is directed toward the left as it folds up in a space to the left of the first holding element 12. The positioning element 22 directs the deflector element 16 away from a seal 28, which is arranged near the air deflector 10, and ensures that the deflector element 16 is not folded up over the seal 28.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. An air deflector for a vehicle roof, comprising:
   a first holding element that is attachable to a vehicle;
   a second holding element movable between a lowered position and a raised position;
   a flexible deflector element secured to the first and second holding elements; and
   at least one resilient positioning element disposed adjacent to the flexible deflector element wherein the at least one resilient positioning element is an elastically deformable lip, and wherein the at least one resilient positioning element pushes the flexible deflector element in a predetermined direction when the second holding element is moved from the raised position to the lowered position, and wherein the at least one resilient positioning element comprises a first shank that extends substantially in a direction of the flexible deflector element when the second holding element is in the raised position and a second shank that is substantially perpendicular to the first shank when the second holding element is in the lowered position.

2. The air deflector as recited in claim 1, wherein the at least one resilient positioning element is attached to the first holding element.

3. The air deflector as recited in claim 1, further comprising at least one piping attached to the flexible deflector element.

4. The air deflector as recited in claim 3, wherein the at least one resilient positioning element is integrally formed with the at least one piping.

5. The air deflector as recited in claim 3, wherein the at least one piping comprises:
   a first piping that is integrally formed with the at least one resilient positioning element and connected to the first holding element; and
   a second piping that is connected to the second holding element.

6. The air deflector as recited in claim 5, wherein the first and second pipings are weather strips.

7. The air deflector as recited in claim 1, wherein the flexible deflector element is made of a flexible sheet material.

8. The air deflector as recited in claim 7, wherein the flexible sheet material is one selected from the group consisting of a fabric material and a web material.

* * * * *